Jan. 11, 1927. 1,613,829
G. F. HONOLD
WHEEL
Filed Oct. 12, 1925
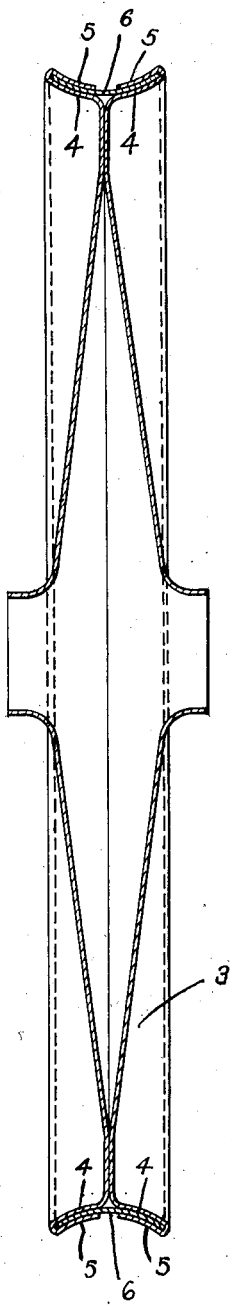
Inventor.
Gottlob F. Honold.
By Morsell, Keeney & Morsell.
Attorneys.

Patented Jan. 11, 1927.

1,613,829

UNITED STATES PATENT OFFICE.

GOTTLOB F. HONOLD, OF SHEBOYGAN, WISCONSIN, ASSIGNOR TO HONOLD MANUFACTURING COMPANY, A CORPORATION OF WISCONSIN.

WHEEL.

Application filed October 12, 1925. Serial No. 62,048.

This invention relates to improvements in wheels, and more particularly to a reinforced wheel rim construction.

It is one of the objects of the invention to provide an efficient and inexpensive rim reinforcement for wheels for coaster wagons and the like.

A further object of the invention is to provide a wheel rim reinforcement of the class described which does not require any departure from standard practice in the design of the wheel and comprises but a single reinforcing strip.

A further object of the invention is to provide a wheel rim reinforcement which can be formed of any desired thickness according to the load to be carried by the wheel.

A further object of the invention is to provide a wheel rim reinforcement which is of very simple construction, is inexpensive, does not alter the appearance of the wheel, is strong and durable and is well adapted for the purposes described.

With the above and other objects in view the invention consists of the improved reinforced wheel rim construction, and its parts and combinations as set forth in the claims and all equivalents thereof.

In the accompanying drawing the view represents a sectional view of a coaster wagon wheel provided with the improved reinforced rim construction.

The wheel illustrated is of the type employed on coaster wagons and children's vehicles and is of metal construction. The body portion 3 of the wheel is formed of two sheets of metal secured together and shaped as shown. In this type of wheel the outer edge portions of the sheets forming the body are bent outwardly, as at 4, and then doubled back, as at 5, thus forming a rim of double thickness.

The present invention resides in the provision of an additional reinforcing means for the wheel rim and said reinforcing means consists of a circular strip or band 6, slightly concave in cross section. The width of said band corresponds to the width of the wheel rim and said reinforcing band is conveniently received by and held in position between the doubled edge portions 4 and 5 of the wheel. Obviously said band efficiently reinforces the wheel rim and it can be of any desired thickness, according to the load to be carried by the wheel. The reinforcement does not in any manner alter the appearance of the wheel and does not require any modification in the construction or design thereof.

From the foregoing description it will be seen that the improved reinforcement for wheel rims is of very simple and novel construction, and is well adapted for the purposes set forth.

What I claim as my invention is:

1. A wheel comprising a pair of disked body members having hub portions, said disk body members gradually converging upwardly from the hub to a point where they are merged into contact with each other, each disk body member being bent outwardly and then inwardly to form a two ply rim, with the outwardly and inwardly bent portions spaced apart, and an annular band positioned within the space between the outwardly and inwardly bent portions.

2. A wheel comprising a pair of disked body portions formed with outstanding hub portions, said disk body members gradually converging upwardly from the hub to a point where they are merged into contact with each other, each disk body member being bent outwardly and then inwardly to form a two ply rim, with the outwardly and inwardly bent portions spaced apart, and an annular band positioned within the space between the outwardly and inwardly bent portions.

In testimony whereof, I affix my signature.

GOTTLOB F. HONOLD.